United States Patent
Horiuchi

(10) Patent No.: US 10,108,122 B2
(45) Date of Patent: Oct. 23, 2018

(54) IMAGE FORMING APPARATUS AND CORRECTION METHOD THEREFOR

(71) Applicant: CANON KABUSHIKI KAISHA, Tokyo (JP)

(72) Inventor: Izuru Horiuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/459,951

(22) Filed: Mar. 15, 2017

(65) Prior Publication Data

US 2017/0277095 A1 Sep. 28, 2017

(30) Foreign Application Priority Data

Mar. 28, 2016 (JP) ................. 2016-064115

(51) Int. Cl.
*G03G 15/04* (2006.01)
*G03G 15/00* (2006.01)
(Continued)

(52) U.S. Cl.
CPC ....... *G03G 15/5033* (2013.01); *G03G 15/043* (2013.01); *G06K 15/12* (2013.01); *H04N 1/00* (2013.01)

(58) Field of Classification Search
CPC ............... G03G 15/043; G03G 15/041; G03G 15/0415; G03G 15/5033; G06K 15/12; G06K 15/1204; G06K 15/1223; H04N 1/00; H04N 1/393; H04N 1/3935; H04N 1/40068
See application file for complete search history.

(56) References Cited

U.S. PATENT DOCUMENTS 7,170,544 B2 1/2007 Horiuchi ........................ 347/247
8,917,305 B2 12/2014 Nakahata et al. ............ 347/244
(Continued)

FOREIGN PATENT DOCUMENTS

JP 2004-338280 12/2004
JP 2013-022913 2/2013

OTHER PUBLICATIONS

U.S. Appl. No. 15/461,206, filed Mar. 16, 2017.
U.S. Appl. No. 15/466,582, filed Mar. 22, 2017.
U.S. Appl. No. 15/462,532, filed Mar. 17, 2017.

*Primary Examiner* — Sophia S Chen
(74) *Attorney, Agent, or Firm* — Fitzpatrick, Cella, Harper & Scinto

(57) ABSTRACT

An image forming apparatus, including: a light source; a photosensitive member rotatable in a first direction; a deflecting unit configured to deflect the light beam in a second direction orthogonal to the first direction; a conversion unit configured to convert image data into a plurality of bit data corresponding to a density on a pixel-by-pixel basis; a specifying unit configured to specify a pixel size that is a number of divided pixels forming a pixel according to a position of the pixel in the second direction; and a correction unit configured to correct the plurality of bit data according to the pixel size, wherein the specifying unit specifies pixel sizes of pixels after an arrangement of the pixels in the second direction is replaced for each pixel group, the pixel group being obtained by dividing, with respect to each predetermined number of pixels, pixels arranged in the second direction.

16 Claims, 15 Drawing Sheets

(51) Int. Cl.
    *G03G 15/043*     (2006.01)
    *G06K 15/12*      (2006.01)
    *H04N 1/00*       (2006.01)

(56) References Cited

U.S. PATENT DOCUMENTS

| | | | |
|---|---|---|---|
| 9,261,809 B2 | 2/2016 | Furuta | G03G 15/043 |
| 2006/0232451 A1* | 10/2006 | Saito | H04N 19/12 |
| | | | 341/50 |
| 2013/0027501 A1 | 1/2013 | Yano | B41J 2/435 |
| 2015/0288852 A1* | 10/2015 | Yano | H04N 1/393 |
| | | | 358/1.2 |
| 2016/0147170 A1 | 5/2016 | Furuta | G03G 15/04072 |
| 2016/0195831 A1* | 7/2016 | Hamada | H04N 1/04 |
| | | | 347/118 |
| 2016/0246208 A1* | 8/2016 | Nagasaki | G03G 15/043 |
| 2017/0019560 A1 | 1/2017 | Horiuchi et al. | H04N 1/113 |
| 2017/0019561 A1 | 1/2017 | Furuta | H04N 1/4052 |
| 2017/0019562 A1 | 1/2017 | Furuta et al. | G03G 15/043 |
| 2017/0019563 A1 | 1/2017 | Araki | H04N 1/06 |
| 2017/0019564 A1 | 1/2017 | Horiuchi | H04N 2201/0094 |
| 2017/0038703 A1 | 2/2017 | Horiuchi et al. | H04N 2201/0094 |
| 2017/0041489 A1 | 2/2017 | Furuta | H04N 2201/0094 |

\* cited by examiner

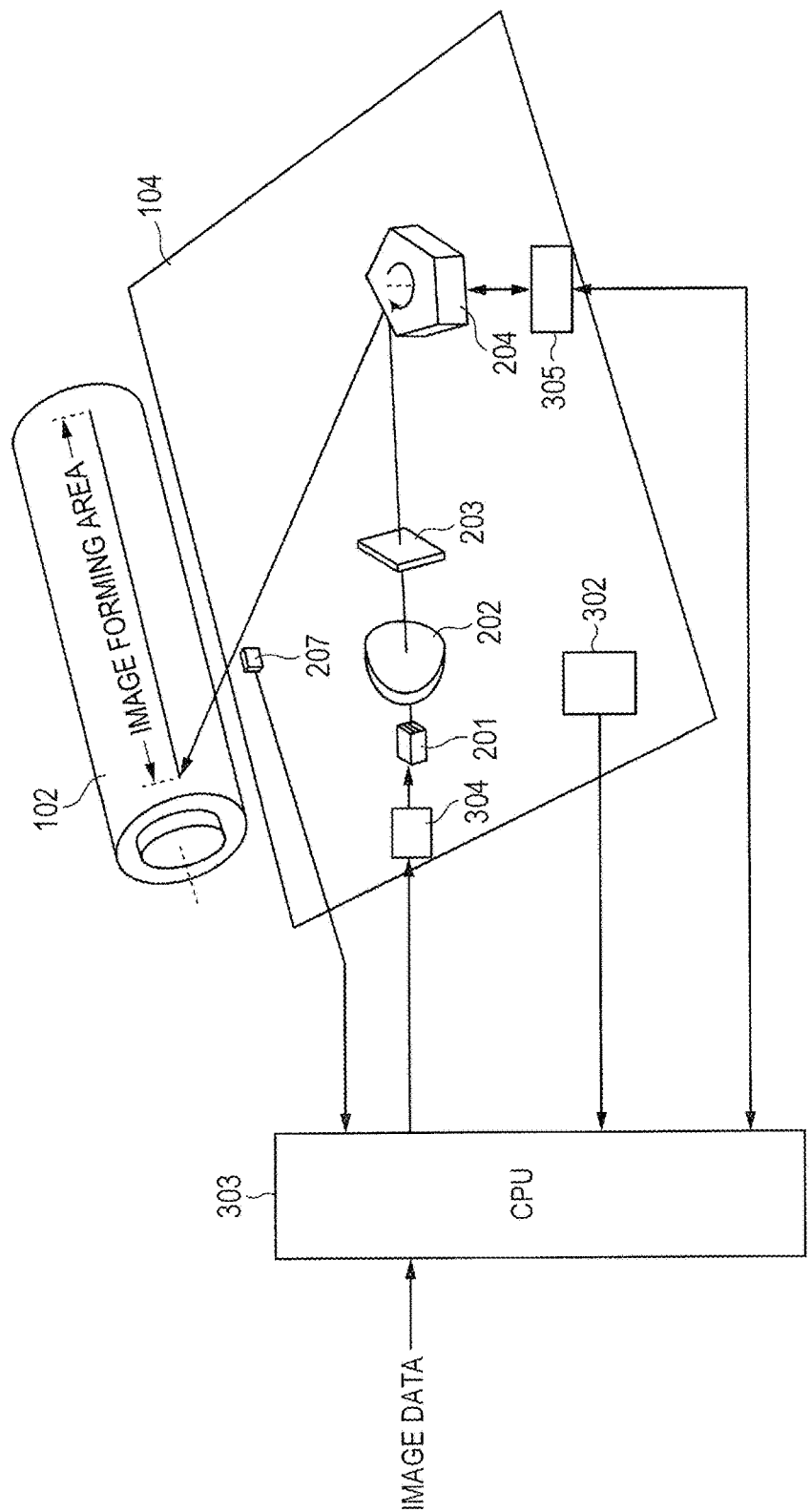

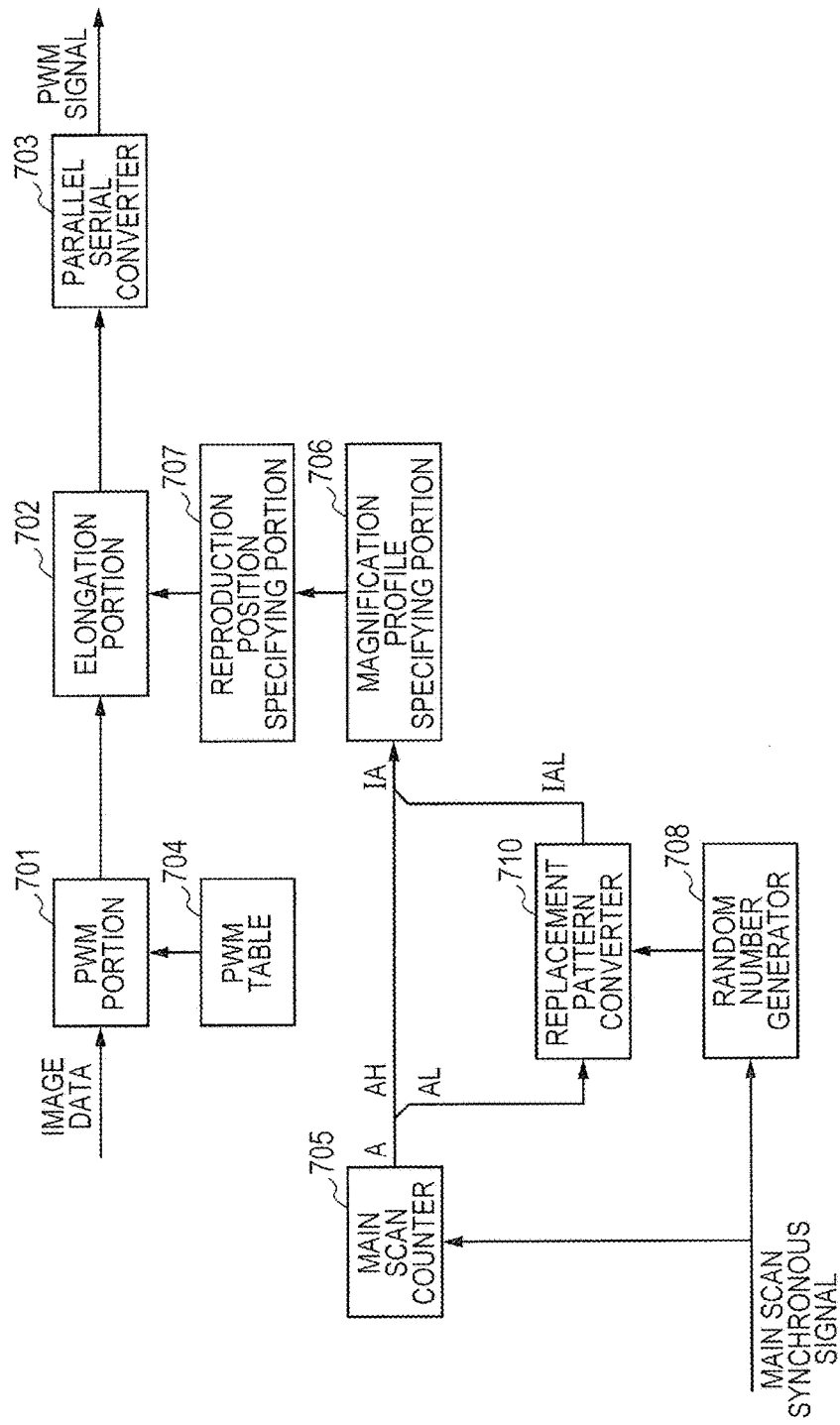

FIG. 4A

| ADDRESS | DATA |
|---------|------|
| 0 | S1 |
| 1 | S2 |
| 2 | S3 |
| 3 | S4 |
| . | . |
| . | . |
| N-1 | SN |

FIG. 4B

| D | REPRODUCTION POSITION | | | | | | | |
|---|---|---|---|---|---|---|---|---|
| 0 | - | - | - | - | - | - | - | - |
| 1 | 11 | - | - | - | - | - | - | - |
| 2 | 7 | 15 | - | - | - | - | - | - |
| 3 | 5 | 11 | 17 | - | - | - | - | - |
| 4 | 3 | 8 | 13 | 18 | - | - | - | - |
| 5 | 3 | 7 | 11 | 15 | 19 | - | - | - |
| 6 | 2 | 5 | 9 | 12 | 16 | 19 | - | - |
| 7 | 2 | 5 | 8 | 11 | 14 | 17 | 20 | - |
| 8 | 1 | 4 | 7 | 9 | 12 | 15 | 17 | 20 |

FIG. 6A

| RANDOM NUMBER | REPLACEMENT PATTERN AL | | | |
|---|---|---|---|---|
| | 0 | 1 | 2 | 3 |
| 0 | 0 | 1 | 2 | 3 |
| 1 | 0 | 1 | 3 | 2 |
| 2 | 0 | 2 | 1 | 3 |
| 3 | 0 | 2 | 3 | 1 |
| 4 | 0 | 3 | 1 | 2 |
| 5 | 0 | 3 | 2 | 1 |
| 6 | 1 | 0 | 2 | 3 |
| 7 | 1 | 0 | 3 | 2 |
| 8 | 1 | 2 | 0 | 3 |
| 9 | 1 | 2 | 3 | 0 |
| 10 | 1 | 3 | 0 | 2 |
| 11 | 1 | 3 | 2 | 0 |
| 12 | 2 | 0 | 1 | 3 |
| 13 | 2 | 0 | 3 | 1 |
| 14 | 2 | 1 | 0 | 3 |
| 15 | 2 | 1 | 3 | 0 |
| 16 | 2 | 3 | 0 | 1 |
| 17 | 2 | 3 | 1 | 0 |
| 18 | 3 | 0 | 1 | 2 |
| 19 | 3 | 0 | 2 | 1 |
| 20 | 3 | 1 | 0 | 2 |
| 21 | 3 | 1 | 2 | 0 |
| 22 | 3 | 2 | 0 | 1 |
| 23 | 3 | 2 | 1 | 0 |

FIG. 6B

| RANDOM NUMBER | REPLACEMENT PATTERN AL | | | |
|---|---|---|---|---|
| | 0 | 1 | 2 | 3 |
| 0 | 0 | 1 | 2 | 3 |
| 1 | 0 | 1 | 3 | 2 |
| 2 | 0 | 2 | 1 | 3 |
| 3 | 0 | 2 | 3 | 1 |
| 4 | 0 | 3 | 1 | 2 |
| 5 | 0 | 3 | 2 | 1 |
| 6 | 1 | 0 | 2 | 3 |
| 7 | 1 | 0 | 3 | 2 |
| 8 | 1 | 2 | 0 | 3 |
| - | 1 | 2 | 3 | 0 |
| 9 | 1 | 3 | 0 | 2 |
| - | 1 | 3 | 2 | 0 |
| 10 | 2 | 0 | 1 | 3 |
| 11 | 2 | 0 | 3 | 1 |
| 12 | 2 | 1 | 0 | 3 |
| - | 2 | 1 | 3 | 0 |
| 13 | 2 | 3 | 0 | 1 |
| - | 2 | 3 | 1 | 0 |
| - | 3 | 0 | 1 | 2 |
| - | 3 | 0 | 2 | 1 |
| - | 3 | 1 | 0 | 2 |
| - | 3 | 1 | 2 | 0 |
| - | 3 | 2 | 0 | 1 |
| - | 3 | 2 | 1 | 0 |

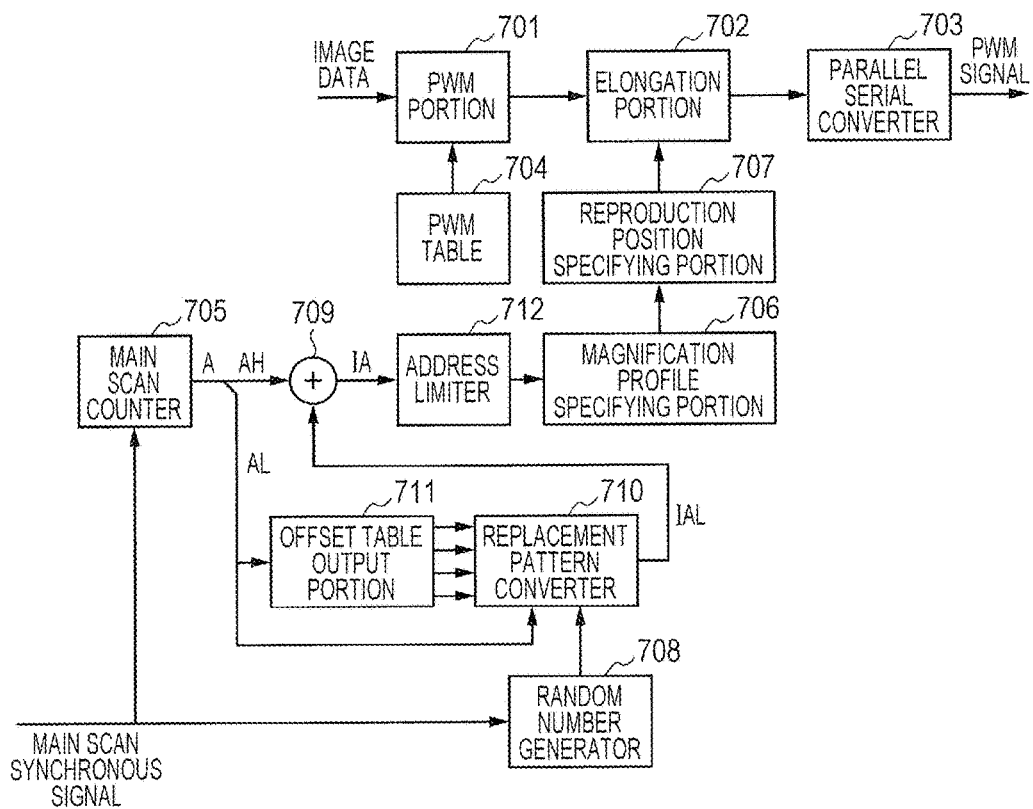

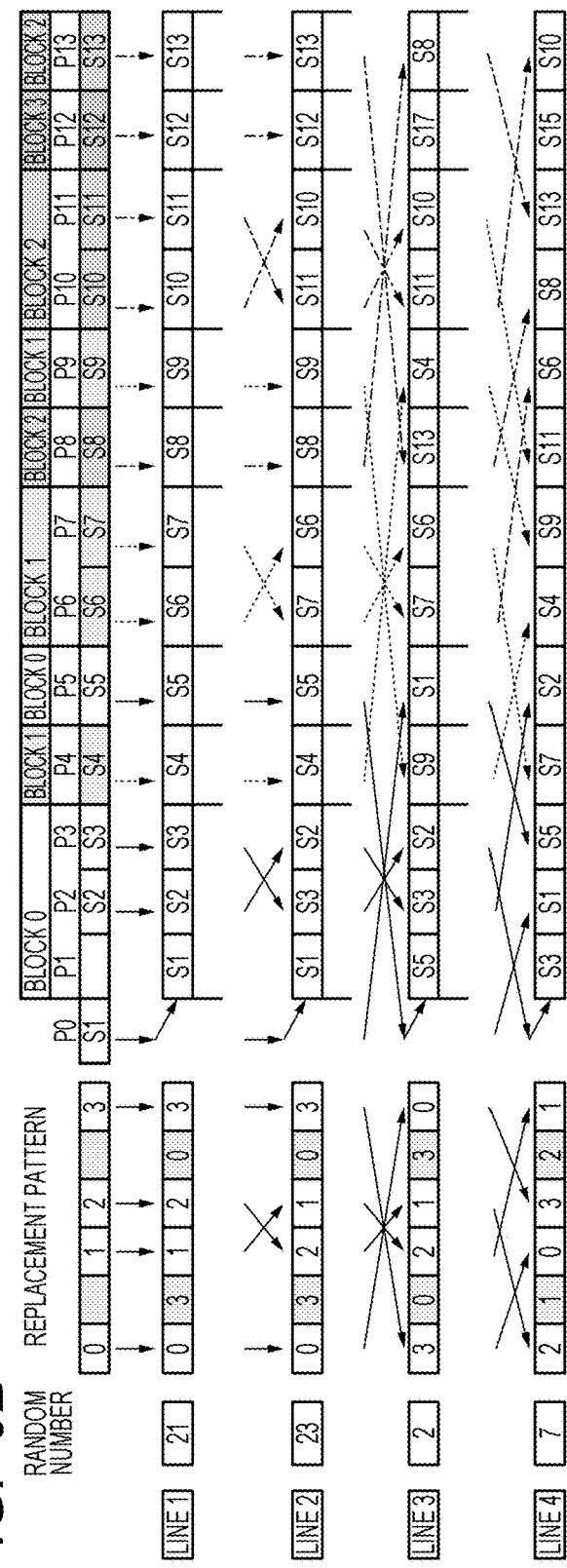

FIG. 10A

| RANDOM NUMBER | REPLACEMENT PATTERN AL | | | | | | | |
|---|---|---|---|---|---|---|---|---|
| | 0 | 1 | 2 | 3 | 4 | 5 | 6 | 7 |
| 0 | 0 | 1 | 2 | 3 | 4 | 5 | 6 | 7 |
| 1 | 7 | 0 | 1 | 2 | 3 | 4 | 5 | 6 |
| 2 | 6 | 7 | 0 | 1 | 2 | 3 | 4 | 5 |
| 3 | 5 | 6 | 7 | 0 | 1 | 2 | 3 | 4 |
| 4 | 4 | 5 | 6 | 7 | 0 | 1 | 2 | 3 |
| 5 | 3 | 4 | 5 | 6 | 7 | 0 | 1 | 2 |
| 6 | 2 | 3 | 4 | 5 | 6 | 7 | 0 | 1 |
| 7 | 1 | 2 | 3 | 4 | 5 | 6 | 7 | 0 |

FIG. 10B

| RANDOM NUMBER | REPLACEMENT PATTERN AL | | | | | | | |
|---|---|---|---|---|---|---|---|---|
| | 0 | 1 | 2 | 3 | 4 | 5 | 6 | 7 |
| 0 | 0 | 1 | 2 | 3 | 4 | 5 | 6 | 7 |
| - | 7 | 0 | 1 | 2 | 3 | 4 | 5 | 6 |
| 1 | 6 | 7 | 0 | 1 | 2 | 3 | 4 | 5 |
| 2 | 5 | 6 | 7 | 0 | 1 | 2 | 3 | 4 |
| 3 | 4 | 5 | 6 | 7 | 0 | 1 | 2 | 3 |
| 4 | 3 | 4 | 5 | 6 | 7 | 0 | 1 | 2 |
| 5 | 2 | 3 | 4 | 5 | 6 | 7 | 0 | 1 |
| - | 1 | 2 | 3 | 4 | 5 | 6 | 7 | 0 |

FIG. 12A

| | BLOCK 0 | | | | BLOCK 1 | | | |
|---|---|---|---|---|---|---|---|---|
| RANDOM NUMBER | 0 | | | | 2 | | | |
| REPLACEMENT PATTERN | 0 | 1 | 2 | 3 | 0 | 2 | 1 | 3 |
| LINE 1 | S1 | S2 | S3 | S4 | S5 | S7 | S6 | S8 |
| RANDOM NUMBER | 23 | | | | 13 | | | |
| REPLACEMENT PATTERN | 3 | 2 | 1 | 0 | 2 | 0 | 3 | 1 |
| LINE 2 | S4 | S3 | S2 | S1 | S7 | S5 | S8 | S6 |

FIG. 12B

| | BLOCK 0 | | | | BLOCK 1 | | | |
|---|---|---|---|---|---|---|---|---|
| RANDOM NUMBER | 0 | | | | 2 | | | |
| REPLACEMENT PATTERN | 0 | 1 | 2 | 3 | 0 | 2 | 1 | 3 |
| LINE 1 | S1 | S2 | S3 | S4 | S5 | S7 | S6 | S8 |
| RANDOM NUMBER | 23 | | | | 13 | | | |
| REPLACEMENT PATTERN | 3 | 2 | 1 | 0 | 2 | 0 | 3 | 1 |
| LINE 2 | S4 | S3 | S2 | S1 | S7 | S5 | S8 | S6 |

FIG. 13B
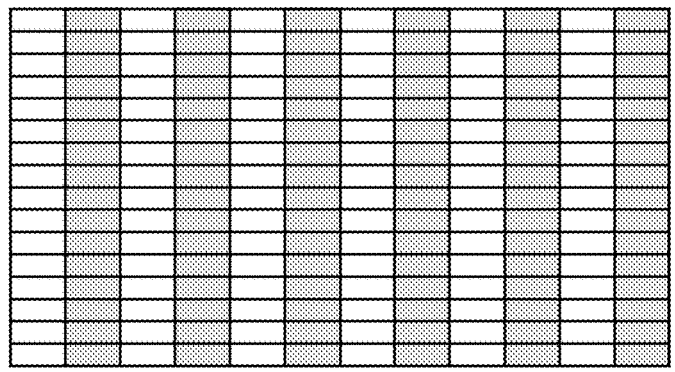
FIG. 13C
FIG. 13D
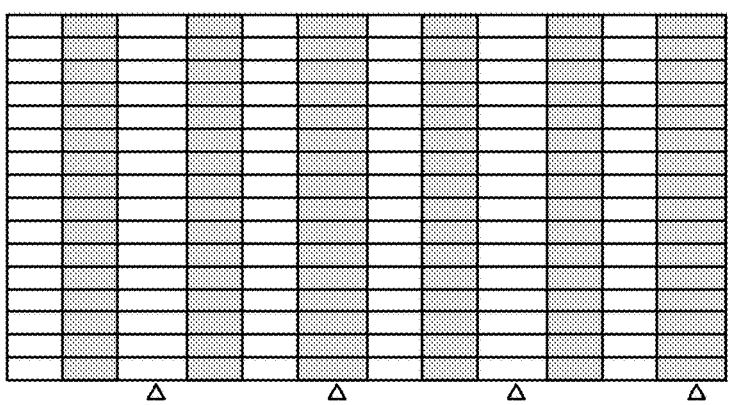

IMAGE FORMING APPARATUS AND CORRECTION METHOD THEREFOR

BACKGROUND OF THE INVENTION

Field of the Invention

The present invention relates to an electrophotographic image forming apparatus, for example, a digital copying machine, and to a correction method for the image forming apparatus.

Description of the Related Art

In an electrophotographic image forming apparatus, for example, a digital copying machine, lighting control is performed with respect to a laser light source in accordance with an image signal to form an electromagnetic latent image on a photosensitive member, and an image is formed on a recording material through a developing step, a transfer step, and a fixing step. Laser light radiated to the photosensitive member is deflected in a longitudinal direction (hereinafter referred to as "main scanning direction") of the photosensitive member with rotation of a rotary polygon mirror to scan the photosensitive member. Moreover, with the rotation of the photosensitive member, the scanning is performed also in a direction orthogonal to the main scanning direction (hereinafter referred to as "sub-scanning direction"). As a result, a two-dimensional latent image is formed. Moreover, the laser light deflected with the rotation of the rotary polygon mirror is radiated to the photosensitive member via an fθ lens so that the laser light has a uniform optical path length and angle of incidence in the longitudinal direction of the photosensitive member.

Meanwhile, in Japanese Patent Application Laid-Open No. 2004-338280, there is disclosed, as an optical configuration without an fθ lens for reduction of cost, a method of performing magnification correction entirely with electric correction. In Japanese Patent Application Laid-Open No. 2004-338280, there is disclosed a method of performing the magnification correction by dividing a photosensitive member into predetermined areas in a main scanning direction, and modulating a frequency of a pixel clock depending on a magnification of each area. In a scanning optical system without an fθ lens, a distance from a rotary polygon mirror to the photosensitive member is increased from a center portion toward an end portion of the photosensitive member, and hence a scanning speed at the end portion is higher than the scanning speed at the center portion. As a result, an image formed in the end portion is elongated as compared to an image formed in the center portion. FIG. 13A is a graph for showing a correspondence between a position in the main scanning direction and a magnification of an image to be formed. The vertical axis indicates the magnification of the image to be formed, and a magnification equal to 1 (1×) is a magnification obtained when an image is formed at a center position in the main scanning direction. The horizontal axis indicates a position in the main scanning direction, and 0 mm indicates the center position in the main scanning direction. With the electric correction unit as in Japanese Patent Application Laid-Open No. 2004-338280, even in an optical system in which pixels have different magnifications as in FIG. 13A, the pixels may be corrected to original sizes by assigning reciprocals of the magnifications of the respective pixels to correction magnifications.

There has been known an electric correction unit which employs a magnification correction method in which digital pulse width modulation (PWM) is used to perform processing for each pixel (hereinafter referred to as "divided pixel") obtained by dividing one pixel in the main scanning direction. In Japanese Patent Application Laid-Open No. 2013-22913, there is disclosed a method in which the magnification correction method is used to vary the magnification by reproducing and inserting the divided pixels instead of modulating the frequency of the pixel clock. For example, with a division number N of the one pixel being 24 (the number of divided pixels being 24), and with a magnification M (M×) in the main scanning direction being in a range of from 1× to 1.3×, the magnification M is changed smoothly along positions in the main scanning direction. In this case, when D divided pixels are selected from among the N divided pixels, and the selected D divided pixels are reproduced and inserted, the new number of divided pixels after reproduction of the divided pixels is (N+D), and a pixel size is (N+D)/N=M×. Therefore, based on (24+0)/24=1× and (24+8)/24=1.3×, the number of divided pixels D to be reproduced and inserted may be selected in a range of from 0 to 8 to obtain a desired varied magnification for each pixel. The obtained magnifications are sparse, but an intermediate magnification may be expressed through combination of different division numbers for local regions.

As described above, with the characteristic of the scanning speed of the scanning optical system without an fθ lens, a magnification to be corrected is determined depending not on a position in the sub-scanning direction but on the position in the main scanning direction. Therefore, when the number of divided pixels is corrected for each main scanning depending on the position in the main scanning direction, pixels having the same division number are arranged at the same position in the main scanning direction as seen from the sub-scanning direction. In a case where pixels having different division numbers are periodically arranged under the state in which the pixels having the same division number are arranged as seen from the sub-scanning direction, when an image pattern that is periodic in the main scanning direction is input to perform the magnification correction, there is a problem in that periods interfere with each other to generate moire. FIG. 13B, FIG. 13C, and FIG. 13D are diagrams for illustrating an example in which moire is generated. In FIG. 13B, FIG. 13C, and FIG. 13D, each square represents a pixel, the horizontal direction indicates the main scanning direction, and the vertical direction indicates the sub-scanning direction. In FIG. 13B, FIG. 13C, and FIG. 13D, a positional relationship of pixels is the same. Moreover, a number in each square of FIG. 13B represents the division number of the pixel (number of divided pixels). In FIG. 13B, there is illustrated an example in which pixels having the same division number are arranged in the sub-scanning direction, and in which pixels having different division numbers are periodically arranged in the main scanning direction. In FIG. 13C, there is illustrated an example of an image pattern of black and white vertical stripes that are periodic in the main scanning direction. FIG. 13D is a diagram for illustrating an image pattern obtained by performing magnification correction of the image pattern of FIG. 13C in accordance with the division numbers of FIG. 13B. In FIG. 13D, the division number of pixels in the vertical direction with the triangle (Δ) mark at the bottom is 25, and the division number of pixels in the vertical direction without the triangle (Δ) mark is 24. In FIG. 13D, there is illustrated how the periods interfere with each other to cause unevenness in widths of black lines and white lines in the vertical direction.

SUMMARY OF THE INVENTION

The present invention has been made in view of the above-mentioned situation, and provides an image forming apparatus, which is configured to perform magnification correction of an image size while suppressing generation of moire.

In order to solve the above-mentioned problem, according to one embodiment of the present invention, there is provided an image forming apparatus, comprising:
- a light source;
- a photosensitive member, which is rotated in a first direction so that a latent image is formed on the photosensitive member with a light beam emitted from the light source in accordance with image data;
- a deflecting unit configured to deflect the light beam emitted from the light source to move a light spot of the light beam radiated to the photosensitive member in a second direction orthogonal to the first direction;
- a conversion unit configured to convert the image data into a plurality of bit data corresponding to a density on a pixel-by-pixel basis;
- a specifying unit configured to specify a pixel size that is a number of divided pixels forming a pixel formed on the photosensitive member with the light beam, in accordance with a position of the pixel in the second direction; and
- a correction unit configured to correct the plurality of bit data in accordance with the pixel size specified by the specifying unit,
- wherein the specifying unit specifies pixel sizes of pixels after an arrangement of the pixels in the second direction in a pixel group is replaced for each pixel group, the pixel group being obtained by dividing, with respect to each predetermined number of pixels, pixels arranged in the second direction.

Further features of the present invention will become apparent from the following description of exemplary embodiments with reference to the attached drawings.

BRIEF DESCRIPTION OF THE DRAWINGS

FIG. 1B is a view for illustrating a configuration of the periphery of a photosensitive drum and a light scanning apparatus.

FIG. 2 is a functional block diagram of a light scanning apparatus in the first embodiment.

FIG. 4A is a table for showing a magnification profile in the first to sixth embodiments.

FIG. 4B is a table for showing reproduction positions of divided pixels.

FIG. 6A is an illustration of a replacement pattern table in the first and second embodiments.

FIG. 6B is an illustration of a replacement pattern table in the fourth embodiment.

FIG. 8A is a functional block diagram of a light scanning apparatus in the second embodiment.

FIG. 8B is a table for showing a configuration of an address offset table.

FIG. 9A and FIG. 9B are diagrams for illustrating replacement of pixel sizes in the second embodiment.

FIG. 10A is an illustration of a replacement pattern table in the third embodiment.

FIG. 10B is an illustration of a replacement pattern table in the fourth embodiment.

FIG. 12A and FIG. 12B are diagrams for illustrating replacement of pixel sizes in the sixth embodiment.

FIG. 13B is a diagram for illustrating division numbers of pixels (numbers of divided pixels).

FIG. 13C is a diagram for illustrating an example of an image pattern of black and white vertical stripes that are periodic in a main scanning direction.

FIG. 13D is a diagram for illustrating an image pattern obtained by performing magnification correction of the image pattern of FIG. 13C in accordance with the division numbers of FIG. 13B.

DESCRIPTION OF THE EMBODIMENTS

Embodiments of the present invention will be described in detail below with reference to the drawings. A direction of an axis of rotation of a photosensitive drum, which is a direction in which scanning is performed with a laser beam, is defined as a main scanning direction that is a second direction, and a rotational direction of the photosensitive drum, which is a direction substantially orthogonal to the main scanning direction, is defined as a sub-scanning direction that is a first direction.

[First Embodiment]

<Overall Configuration of Image Forming Apparatus>

Figure 1A:
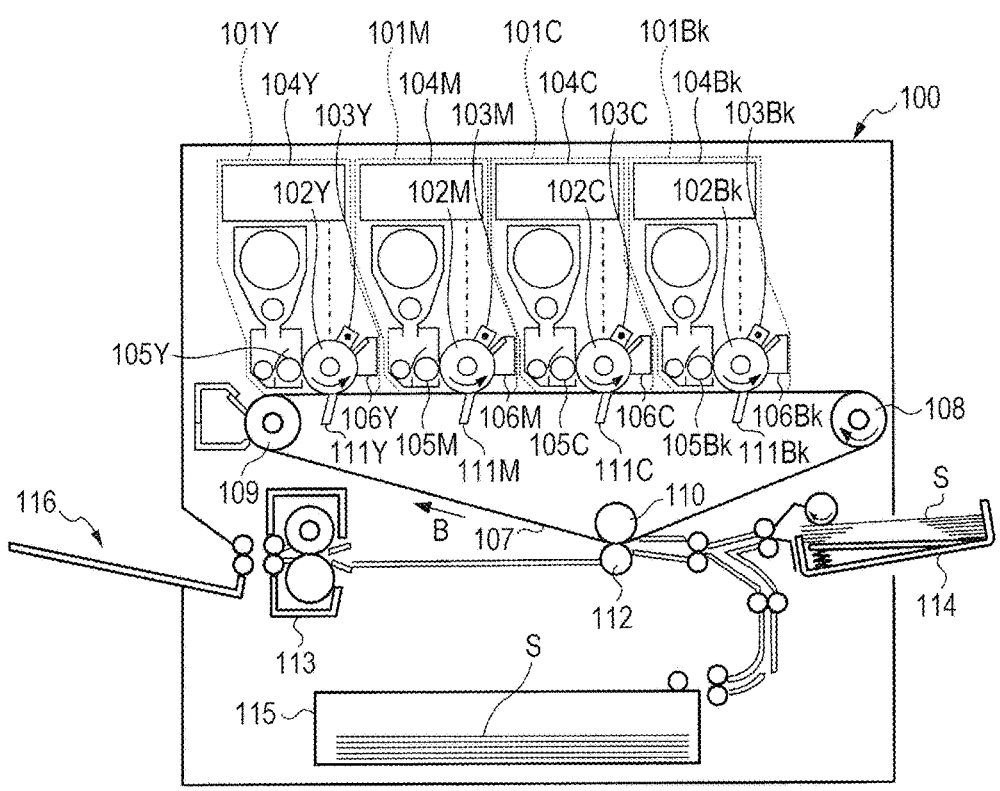
FIG. 1A is a view for illustrating the entirety of an image forming apparatus according to first to sixth embodiments.

FIG. 1A is a schematic cross-sectional view of a digital full-color printer (color image forming apparatus) configured to perform image formation by using toners of a plurality of colors. An image forming apparatus 100 according to a first embodiment of the present invention will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk perform image formation by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102, which is a photosensitive member. A charging device 103, a light scanning device 104, and a developing device 105, which is a developing unit, are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer the toner image on the intermediate transfer belt 107 onto a sheet S being a recording medium and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The charging device 103Y of the image forming portion 101Y charges the photosensitive drum 102Y that is driven to rotate in the arrow direction (counterclockwise direction) illustrated in FIG. 1A. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed by the developing device 105Y to form a toner image of yellow. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116.

<Photosensitive Drum and Light Scanning Device>

FIG. 1B is an illustration of configurations of the photosensitive drum 102, the light scanning device 104, and a controller for the light scanning device 104. The light scanning device 104 includes a multi-beam laser light source (hereinafter referred to as "laser light source") 201, a collimator lens 202, a cylindrical lens 203, and a rotary polygon mirror 204, which is a deflecting unit. The laser light source 201 is a multi-beam laser light source, which is configured to generate laser light (light beam) by a plurality of light emitting elements. The collimator lens 202 is configured to collimate the laser light. The cylindrical lens 203 condenses the laser light having passed through the collimator lens 202 in the sub-scanning direction. In the embodiment, the laser light source 201 is described by exemplifying a multi-beam light source in which a plurality of beams are arranged, but is similarly operated also in the case of using a single light source. The laser light source 201 is driven by a multi-beam laser drive circuit (hereinafter simply referred to as "laser drive circuit) 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion 305. The light scanning apparatus 104 also includes a memory 302, which is a storage portion having various kinds of information stored therein. The light scanning apparatus 104 in the embodiment does not include an fθ lens, which is a condenser lens constructing an optical system configured to optically correct a scanning position for each face of the rotary polygon mirror (called "optical face tangle error correction system").

Further, the light scanning device 104 includes a beam detector 207 (hereinafter referred to as "BD 207"), which is a signal generating unit configured to detect the laser light deflected by the rotary polygon mirror 204 and output a horizontal synchronization signal (hereinafter referred to as "BD signal") in accordance with the detection of the laser light. The laser light emitted from the light scanning device 104 scans the photosensitive drum 102. The light scanning device 104 and the photosensitive drum 102 are positioned so that the laser light scans the photosensitive drum 102 in a direction substantially parallel to the rotary shaft of the photosensitive drum 102. Every time the mirror face of the rotary polygon mirror 204 scans the photosensitive drum 102, a spot of the light beam of the multi-beam laser is moved (scanned) in the main scanning direction, to thereby form scanning lines corresponding to the number of laser elements (light emitting elements) simultaneously. In the embodiment, the number of mirror faces of the rotary polygon mirror 204 is five. However, the number of mirror faces is not limited to five, and may be another number. For example, when the laser light source 201 has the structure including eight laser elements, image formation for eight lines is performed with one of the mirror faces of the rotary polygon mirror 204, that is, in one scanning with laser light. Therefore, the rotary polygon mirror 204 scans with the laser light five times per rotation to perform image formation for 40 lines.

As illustrated in FIG. 1B, the CPU 303 is configured to receive image data from an image controller (not shown) configured to generate image data. The CPU 303 is electrically connected to the BD 207, the memory 302, the laser drive circuit 304, and the rotary polygon mirror drive portion (hereinafter referred to as "mirror drive portion") 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive the motor portion.

[Image Control]

FIG. 2 is a diagram for illustrating image processing performed by the CPU 303 in the embodiment as functional blocks. As described above with reference to FIG. 1B, image data of a raster image is input in units of a page from the image controller (not shown) configured to generate the image data to the CPU 303. Then, the CPU 303 performs processing on the input image data, and outputs a PWM signal corresponding to the image data to the laser drive circuit 304.

Figures 3A, 3B, 3C:
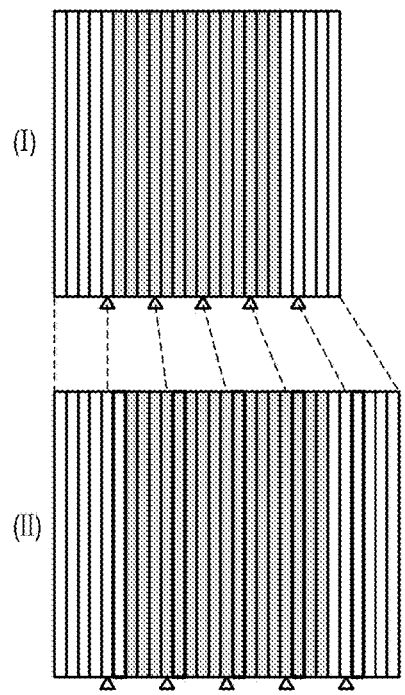
FIG. 3A is a table for showing a PWM pattern in the first to sixth embodiments.
FIG. 3B is a diagram for illustrating enlargement of a pixel.
FIG. 3C is a diagram for illustrating a relationship between PWM data and a PWM signal.

Next, the image processing performed by the CPU 303 will be described with reference to FIG. 2. When the image data is input from the image controller, a PWM portion 701 which is a conversion unit refers to a PWM table 704 to convert the input image data into a PWM pattern on a pixel-by-pixel basis. An example of setting of the PWM table 704 in the embodiment is shown in FIG. 3A. The CPU 303 sets the PWM table 704 shown in FIG. 3A before performing the image processing. The PWM table 704 is a table for use by the PWM portion 701 in converting the image data into the PWM pattern. As shown in FIG. 3A, the PWM table 704 shows correspondences between a gradation of the image data input from the image controller (input data) and the PWM pattern output by the PWM portion 701.

In FIG. 3A, the "input data" indicates a density gradation of image data for one input pixel in 16 levels (4 bits) of 0 to 15, and is arranged so that a gradation value is increased downward. Meanwhile, the "output data" indicates the PWM pattern as a conversion result for the input image data. The values 0 to 23 assigned to the "output data" indicate positions (output positions) of bit data included in the PWM pattern as a conversion result corresponding to one pixel. As the value of 0 to 23 assigned to the "output data" becomes smaller, the value indicates a higher bit. Further, the values 0 to 23 indicate reproduction positions of bit data to be added to the PWM pattern, which are to be described later. The PWM pattern is a bit pattern of a bit data sequence consisting of 24 bits. In the embodiment, a division number (number of divided pixels) of one pixel before magnification correction of an image is set to 24. Moreover, the numbers 0 and 1 in the squares in FIG. 3A correspond to OFF and ON of the PWM signal, respectively, and correspond to white and black of the image density, respectively.

In the setting example of FIG. 3A, there is shown the PWM pattern in which, as the gradation value of the input data becomes larger, an area of black (number: 1) becomes larger from the center of the pixel. The number of black squares (1s) in the PWM pattern is 0 when the gradation value of the input data is 0 (bit pattern: '0000'), 3 when the gradation value is 1 (bit pattern: '0001'), and 5 when the gradation value is 2 (bit pattern: '0010'). Further, the number of black squares (1s) in the PWM pattern is 6 when the gradation value of the input data is 3 (bit pattern: '0011'), and 24 when the gradation value is 15 (bit pattern: '1111').

An elongation portion 702 is configured to insert reproductions of the divided pixels into the PWM pattern output from the PWM portion 701 to generate a PWM pattern corresponding to a pixel magnification. Therefore, a magnification profile specifying portion 706, which is a specifying unit, reads the division number (the number of divided pixels forming one pixel) of a pixel having a pixel number (address) specified by a main scan counter 705 from a magnification profile, which is to be described later, and outputs the read division number. A reproduction position specifying portion 707 selects arrangement positions (insertion positions) of the divided pixels to be reproduced, which correspond to the number of divided pixels to be reproduced based on the division number of the divided pixels output from the magnification profile specifying portion 706, from enlargement patterns in an elongation table, and outputs the selected arrangement positions to the elongation portion 702. Then, the elongation portion 702 inserts the reproduced divided pixels into the PWM pattern, which has been output from the PWM portion 701, based on the arrangement positions shown in the selected enlargement pattern, which has been output from the reproduction position specifying portion 707. The elongation portion 702 and the reproduction position specifying portion 707 are correction units configured to correct the PWM pattern, which is the bit data output from the PWM portion 701.

FIG. 4A is a table for showing an example of a magnification profile used by the magnification profile specifying portion 706, which is the specifying unit, in reading a pixel size in accordance with a signal IA indicating a pixel position in the main scanning direction. The magnification profile is a table in which an address indicating a pixel position in the main scanning direction is associated with a pixel size (number of divided pixels) of a pixel formed at the corresponding pixel position, and is stored in the memory 302. In FIG. 4A, pixel sizes at pixel positions of addresses 0 to (N−1) are represented by S1 to SN. For example, it is assumed that, as a pixel size Sn of a pixel formed at the n-th pixel position, 29 (the number of divided pixels is 29) is read from the magnification profile shown in FIG. 4A. As described above, in the embodiment, the minimum pixel size Sbase is 24 (the number of divided pixels is 24), and hence a reproduction number D, which is the number of divided pixels to be reproduced, is 5 (=pixel size Sn (29)−pixel size Sbase (24)).

FIG. 4B is a table for showing an example of the elongation table used by the reproduction position specifying portion 707 in reading the positions of the pixels to be reproduced. The elongation table is a table for showing a correspondence between the reproduction number D (0 to 8) and the reproduction positions, which is information on bit positions at which the reproduced pixels are to be inserted, and is stored in the memory 302. In FIG. 4B, it is shown that, when the reproduction number D is 1, a reproduction position is 11, that is, a divided pixel is reproduced and inserted next to the output position 11 of the PWM pattern shown in FIG. 3A. Similarly, it is shown that, when the reproduction number D is 8, divided pixels (bit data) are inserted next to eight reproduction positions including 1, 4, 7, 9, 12, 15, 17, and 20. When the above-mentioned reproduction number D is 5, reproduction positions are 3, 7, 11, 15, and 19 as can be seen in FIG. 4B.

With reference to FIG. 3B, control in the elongation portion 702 to elongate the PWM pattern, which has been output from the PWM portion 701, by inserting the reproduced divided pixels into the PWM pattern will be described. FIG. 3B includes two diagrams (I) and (II). The diagram (I) indicates a PWM pattern before the elongation, and the diagram (II) indicates a PWM pattern after the elongation. The diagram (I) indicates a PWM pattern of one pixel when the gradation of the input data is 8 in the PWM table 704 of FIG. 3A. The PWM pattern of the diagram (I) is shown to include, in order from the left, the output position 23 to the output position 0, in which five divided pixels at the output positions 23 to 19 indicate 0s (white), fourteen divided pixels at the output positions 18 to 5 indicate 1s (black), and five divided pixels at the output positions 4 to 0 indicate 0s (white). Moreover, the triangles (Δ) shown at the bottom of the diagram (I) indicate reproduction positions specified by the reproduction position specifying portion 707 when the reproduction number D=5. In the elongation portion 702, divided pixels at the reproduction positions are each reproduced and inserted at a position next to a position specified as the reproduction position shown in the diagram (I) (next position in an increasing direction of the output position). The diagram (II) indicates the PWM pattern after the elongation, and the output positions illustrated with bold black frames indicate the reproduction positions of the diagram (I), and the output positions with the triangles at the bottom indicate the insertion positions of the divided pixels that have been reproduced and inserted. The divided pixels with the triangles are divided pixels obtained by reproducing the next divided pixels illustrated with the bold black frames and inserting the reproduced divided pixels.

A parallel serial converter 703 serially outputs the bit data, which are contained in the PWM pattern that has been elongated in the elongation portion 702, one bit at a time in accordance with a clock signal. FIG. 3C is a diagram for illustrating control in which the PWM pattern that has been serially output from the PWM portion 701 is elongated in the elongation portion 702 and output as the PWM signal from the parallel serial converter 703. In FIG. 3C, the diagram (I) indicates image data illustrated in (I) of FIG. 3B, which is input to the elongation portion 702. The diagram (II) indicates image data illustrated in the diagram (II) of FIG. 3B, which is output from the elongation portion 702. The diagram (III) indicates the PWM signal, which is obtained by inputting the PWM pattern illustrated in the diagram (II) to the parallel serial converter 703, and is output from the parallel serial converter 703. The dotted lines illustrated in FIG. 3C indicate points of change of an image signal (image data).

The main scan counter 705 outputs a signal A for specifying a pixel position (address) from which the magnification profile specifying portion 706 is to read the pixel size (e.g., S1) from the magnification profile. The main scan counter 705 is reset for each scanning line with a main scan synchronizing signal, which is the BD signal, and has a counter value incremented for each pixel. A random number generator 708 is also reset for each scanning line with the main scan synchronizing signal. In the embodiment, the signal A consists of 13 bits (bits 0 to 12). Further, a signal AH indicates higher 11 bits, that is, bits 2 to 12 in the signal A, and a signal AL indicates lower 2 bits, that is, bits 0 and 1 in the signal A. A replacement pattern converter 710, which is a correction unit, and to which the signal AL is input, is configured to convert the signal AL into a signal IAL in accordance with a replacement pattern selected in accordance with the random number generated in the random number generator 708, which is a generation unit, to output the signal IAL. The output signal IAL is merged with the signal AH to generate a signal IA, which is input to the magnification profile specifying portion 706. The magnification profile specifying portion 706 reads pixel sizes from input addresses corresponding to the signal IA in which the lower bits (signal AL) of the magnification profile are replaced, and outputs the read pixel sizes, with the result that the replaced pixel sizes are output.

[Processing Sequence of Image Control]

Figure 5:
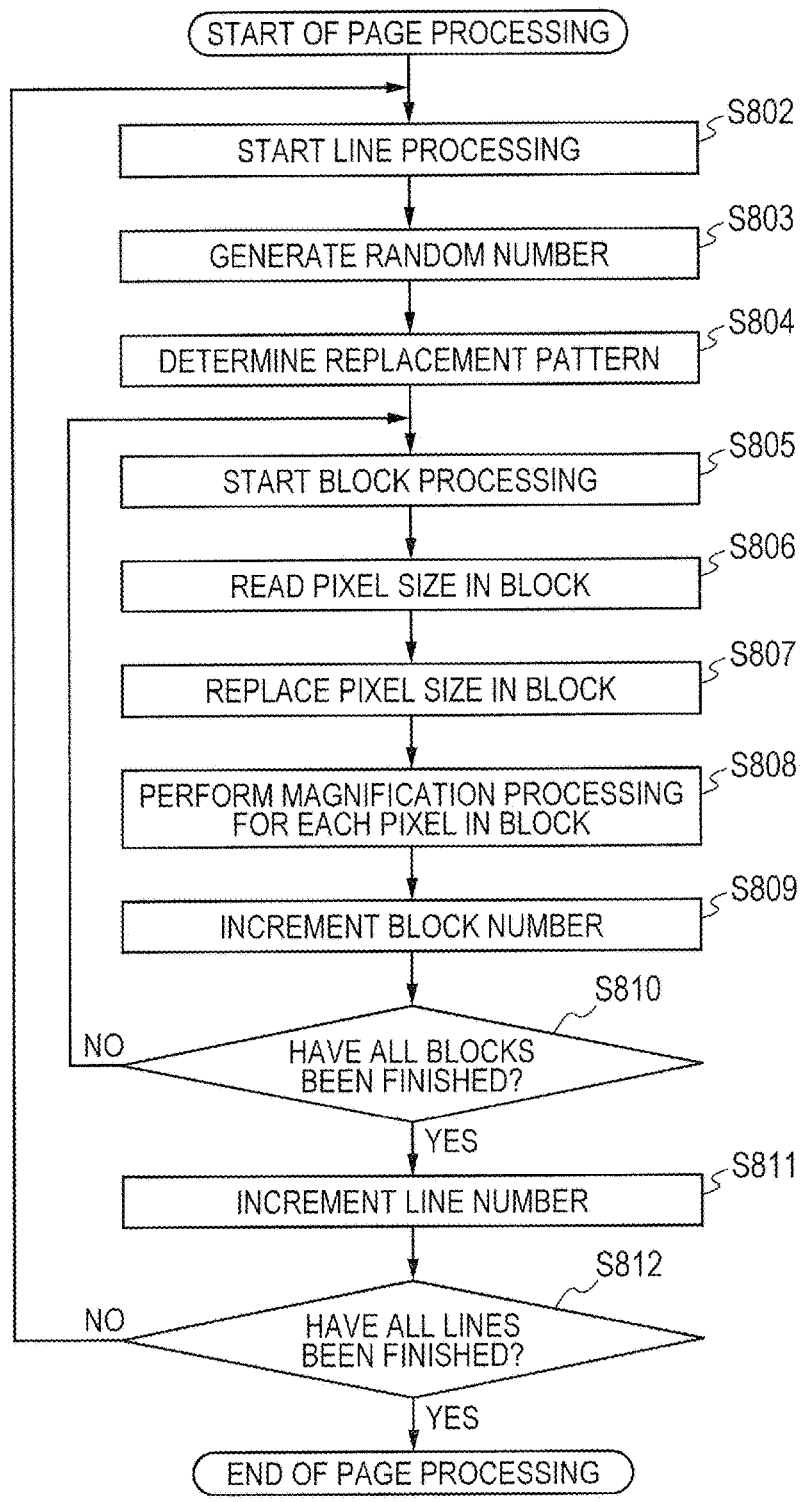
FIG. 5 is a flow chart for illustrating a processing sequence of image control in the first embodiment.

Next, a processing sequence of image control in the embodiment will be described with reference to a flow chart illustrated in FIG. 5. FIG. 5 is a flow chart for illustrating a page processing sequence of the image control performed by the functional blocks illustrated in FIG. 2, and the page processing sequence is started when image data is input in units of a page from the image controller (not shown), and is executed by the CPU 303. In order to perform image processing for one page, the CPU 303 sets the line number, which indicates the scanning line to be processed, to 1, and starts the processing illustrated in FIG. 5.

In Step S802, the CPU 303 starts line processing in accordance with the main scan synchronizing signal (BD signal). The CPU 303 sets the block number for specifying a block, which is a pixel group to be described later, to 0, and resets the main scan counter 705 configured to specify a main scanning position, which is a pixel position of a pixel to be read. The term "main scanning position" refers to a pixel position (address) of a pixel in the above-mentioned magnification profile. Thereafter, the main scan counter 705 is incremented by one for each pixel with an address of the first pixel in the main scanning direction being 0. As a count range of the main scan counter 705, when a resolution of a short-side direction (297 mm) of an A3 sheet is 600 dpi, for example, 7,200 pixels may be counted to cover one line in the main scanning direction. Moreover, a counter value of 7,200 may be expressed with 13 bits, which is the same as the number of bits of the signal A from the above-mentioned main scan counter.

In Step S803, as described above in regard to the random number generator 708, the CPU 303 generates an integer in a range of from 0 to 23 as a random number for each line. In Step S804, based on the random number generated in Step S803, the CPU 303 causes the replacement pattern converter 710 to determine a replacement pattern using a replacement pattern table. The random number is newly generated each time the line number indicating the scanning line to be processed, that is, the scanning line is switched. In the example illustrated in FIG. 7A and FIG. 7B, which are to be described later, as the line number transitions in the order of 1, 2, 3, and 4, a random number value transitions in the order of 0, 2, 23, and 13. In FIG. 6A, there is shown an example of the replacement pattern table used by the replacement pattern converter 710 in the embodiment and a second embodiment of the present invention, which is to be described later. In FIG. 6A, the column on the left shows the random numbers generated by the random number generator 708. As the random number value, an integer of from 0 to 23 is generated. The replacement pattern shows a replacement pattern indicating the replaced signals IAL for the signals AL (0 to 3) input to the random number generator 708. For example, when the random number is 0, signals IAL(0, 1, 2, 3), which form the same replacement pattern as the input signals AL(0, 1, 2, 3), are selected, and in this case, the replacement is not performed. In contrast, when the random number is 23, signals IAL(3, 2, 1, 0), which form a pattern in which the pixel positions are replaced, are selected for the input signals AL(0, 1, 2, 3). In this case, when the signals AL are 0, 1, 2, and 3, image sizes of the signals IAL of 3, 2, 1, and 0 are respectively read, and pixel positions are replaced.

Figures 7A, 7B:
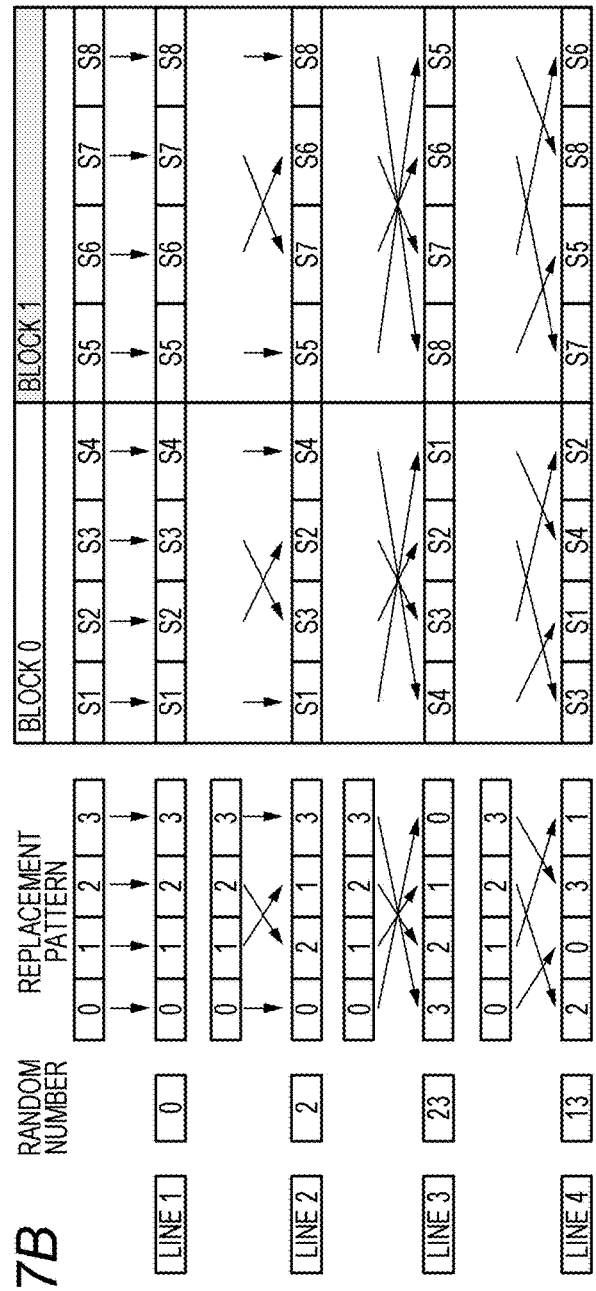
FIG. 7A and FIG. 7B are diagrams for illustrating replacement of pixel sizes in the first embodiment.

In the processing performed in Step S805 to Step S808 for each block, the CPU 303 treats a cycle of the signals AL=0, 1, 2, and 3 as one block to perform the processing. In other words, the CPU 303 performs the processing with four pixels being one block. FIG. 7A is a diagram for illustrating block processing of FIG. 5. In FIG. 7A, there are illustrated, from the left, the line numbers (in FIG. 7A, Line 1 to Line 4), the random number values (in FIG. 7A, random number), the replacement pattern table (in FIG. 7A, replacement pattern), and a relationship between a pixel configuration of each block and a pixel size (S1 to S8) at each pixel position. The random number value indicates the random number value generated by the random number generator 708 for each line number. The replacement pattern indicates a replacement pattern selected based on the random number value and the above-mentioned replacement pattern table of FIG. 6A. Moreover, the block number (Block 0, Block 1, . . . ) indicates a block consisting of four pixels, which is regularly divided every four pixels, that is, every predetermined number of pixels.

Moreover, FIG. 7B is a diagram obtained by depicting arrows indicating positional relationships of replacement of pixels in a block (in a pixel group) in FIG. 7A. For example, regarding the arrows shown in the replacement pattern, replacement of pixels is not performed for Line 1, and hence the arrows are illustrated to point to the same signals AL(0, 1, 2, 3) before and after the replacement. As to Line 2, replacement is not performed for the signals AL(0) and AL(3), and hence the arrows point to the same signals AL(0) and AL(3) before and after the replacement. In contrast, for the signals AL(1) and AL(2), replacement in which the signal AL(2) and the signal AL(1) are arranged in place of the signal AL(1) and the signal AL(2), respectively, is performed, and hence the arrows point from the signal AL(2) to the signal AL(1), and from the signal AL(1) to the signal AL(2). The same applies to Line 3 and Line 4. Moreover, the arrows illustrated in Block 0 and Block 1 are similar to those illustrated in the replacement pattern.

In Step S805, the CPU 303 starts the block processing. In Step S806, the CPU 303 causes the replacement pattern converter 710 to read pixel sizes in a block. For example, as illustrated in FIG. 7A, when the line number is (Line 4), the random number value is 13. Therefore, in FIG. 6A, for the signals AL=0, 1, 2, and 3 when the random number is 13, the signals IAL=2, 0, 3, and 1 are respectively output by the replacement pattern converter 710.

In Step S807, the CPU 303 replaces the pixel sizes in the block. The signal IA (consisting of bits 0 to 12) of an input address used by the magnification profile specifying portion 706 in reading the pixel sizes from the magnification profile is obtained by merging the signal AH (consisting of bits 2 to 12), which is a higher address, and the signal IAL (consisting of bits 0 and 1), which is a lower address. Therefore, replacement of lower two bits changes the reading order of the pixels to be read in one block with four pixels arranged in the main scanning direction being a unit, and hence the pixel sizes are also replaced. For example, when the line number is 4, and when the signals AL are 0, 1, 2, and 3, the replacement pattern converter 710 outputs 2, 0, 3, and 1 as the signals IAL, with the result that S3, S1, S4, and S2 are read in the stated order in Block 0. Moreover, S7, S5, S8, and S6 are read in the stated order in Block 1. In the embodiment, a size of one block is set to 4 pixels, and a block size of a power of 2 is selected. Therefore, there is adopted a configuration in which, with the operation of replacing the lower two bits of the signal IA of the input address, which is input to the magnification profile specifying portion 706, the pixel sizes to be read may be replaced easily.

In Step S808, the CPU 303 performs the processing for each pixel in the block, that is, the processing by the above-mentioned elongation portion 702. The CPU 303 causes the reproduction position specifying portion 707 to calculate the number of divided pixels to be reproduced based on the pixel sizes (number of divided pixels) output from the magnification profile specifying portion 706, and selects the positions at which the reproduced divided pixels are to be arranged from among the enlargement patterns of the elongation table. Then, the CPU 303 causes the elongation portion 702 to reproduce and insert the divided pixels at the reproduction positions, which are specified in the enlargement pattern selected by the reproduction position specifying portion 707, of the PWM pattern output from the PWM portion 701.

In Step S809, the CPU 303 increments the block number. In Step S810, the CPU 303 refers to the block number to determine whether processing for all blocks in one scanning line has been finished. The CPU 303 proceeds the processing to Step S811 when determining that the processing for all blocks has been finished, and returns the processing to Step S805 when determining that the processing has not been finished.

In Step S811, the CPU 303 increments the line number indicating the line to be processed. In Step S812, the CPU 303 refers to the line number to determine whether processing for all lines in one page has been finished. The CPU 303 ends the processing when determining that the processing for all lines has been finished, and returns the processing to Step S802 when determining that the processing for all lines has not been finished.

In the random number generation in the embodiment, a linear feedback shift register (LFSR) is used to generate a random number. However, another pseudo-random number may be used. For example, a random number table may be provided in advance. As described above, according to the embodiment, a different replacement pattern is selected for each line, and hence quantization errors caused by the magnification correction are not consecutive in the sub-scanning direction, with the result that moire may be made visually inconspicuous. Moreover, the order of the pixel sizes in the main scanning direction for each pixel in accordance with the magnification profile is replaced with a different replacement order for each line in a group obtained by dividing the main scanning direction into blocks, with the result that generation of moire may be prevented. Moreover, the replacement is performed in a block (in a pixel group), with the result that a sum of the pixel sizes is unchanged, and that positional deviation between lines may be minimized.

As described above, according to the embodiment, the magnification correction of the image size may be performed while suppressing the generation of moire.

[Second Embodiment]

In the first embodiment, the example in which the replacement of pixels in one block is performed has been described. In the second embodiment, an example in which replacement of pixels is performed with an overlap between adjacent blocks will be described.

[Image Control]

FIG. 8A is a diagram for illustrating image processing executed by the CPU 303 in the embodiment as functional blocks. A configuration illustrated in FIG. 8A is similar to the configuration in the first embodiment illustrated in FIG. 2 except for some components. Specifically, in FIG. 8A, the PWM portion 701, the PWM table 704, the elongation portion 702, the reproduction position specifying portion 707, the parallel serial converter 703, the main scan counter 705, the magnification profile specifying portion 706, and the random number generator 708 are similar to those in the first embodiment.

In the first embodiment, the replacement pattern converter 710 replaces values of the signals AL of the lower two bits of the signal A output from the main scan counter 705 by the selected replacement pattern in accordance with the random value generated for each scanning line. In this manner, replacement of pixels closed in one block is performed. In contrast, in the embodiment, replacement of pixels is performed with an overlap between adjacent blocks. Therefore, the embodiment is different in a configuration in which addresses of pixels to be read, which are input to the magnification profile specifying portion 706, are replaced in accordance with the signal A, which is output from the main scan counter 705, and the random number, which is output from the random number generator 708. In the embodiment, the replacement pattern converter 710 in the first embodiment is changed to the following components: the replacement pattern converter 710, an offset table output portion 711, an adder 709, and an address limiter 712.

The signal A from the main scan counter 705 has a 13-bit configuration (bits 0 to 12). As in the first embodiment, the signal A is divided into the signal AH (higher 11 bits, that is, bits 2 to 12 in the signal A) and the signal AL (lower 2 bits, that is, bits 1 and 0 in the signal A). The offset table output portion 711 uses an offset table to output one combination of offset addresses from among four combinations of offset addresses depending on the value (0 to 3) of the signal AL. FIG. 8B is a table for showing a combination of offset addresses to be output depending on the value of the signal AL. In FIG. 8B, the leftmost column indicates In, that is, the value (0 to 3) of the signal AL, and the remaining columns indicate Out, that is, the combinations of offset addresses. The offset table output portion 711 outputs offset addresses corresponding to the input signal AL to the replacement pattern converter 710 so as to refer to reference source addresses of the block defined in the embodiment. The numbers 0, 1, 2, and 3 in the Out column indicate the signal IAL in the replacement pattern table selected by the replacement pattern converter 710. In the table of FIG. 8B, when the signal AL is 0 (In is 0), signs of the offset addresses are negative (−), and hence replacement with a pixel in the preceding adjacent block is performed. Meanwhile, when the signal AL is 3 (In is 3), signs of the offset addresses are positive (+), and hence replacement with a pixel in the succeeding adjacent block is performed. Moreover, when the signal AL is 1 or 2 (In is 1 or 2), replacement with pixels in the same block is performed. Details will be described later.

As in the first embodiment, the random number generator 708 outputs an integer of from 0 to 23 to the replacement pattern converter 710. The replacement pattern converter 710 selects a replacement pattern from the table of FIG. 6A based on the random number value, which has been input from the random number generator 708, and the signal AL from the main scan counter 705. Then, the replacement pattern converter 710 selects, depending on a table value corresponding to the signal AL of the selected replacement pattern, data (offset) corresponding to the table value from the offset addresses output from the offset table output portion 711, and outputs the signal IAL. The adder 709 adds the signal AH with the lower 2 bits being set to 0 of the signal A and the offset output from the replacement pattern converter 710, and outputs a result of the addition as the signal IA to the address limiter 712. The address limiter 712 sets the address obtained through the addition by the adder 709 to 0 when the address is negative, and to the maximum value of the address of the magnification profile when the address exceeds the maximum value, and outputs the address to the magnification profile specifying portion 706.

[Pixel Replacement Processing]

FIG. 9A is a diagram for illustrating processing performed by the replacement pattern converter 710 and the offset table output portion 711 of FIG. 8A. In FIG. 9A, there are illustrated, from the left, the line number (in FIG. 9A, Line 1 to Line 4), the random number value (in FIG. 9A, random number), the replacement pattern table (in FIG. 9A, replacement pattern), and a relationship between a pixel configuration of each block and a pixel size (e.g., S1 to S13) at each pixel position. The random number value indicates the random number value generated by the random number generator 708 for each line number. The replacement pattern indicates a replacement pattern selected based on the random number value and the above-mentioned table of FIG. 6A. Moreover, the block number (Block 0, Block 1, indicates a block consisting of four pixels. Also in the embodiment, one block consists of four pixels, but pixels at the ends of the block (first pixel and fourth pixel in the block) are arranged to be sandwiched by pixels of adjacent blocks, and hence extend across a region of a total of six pixels. However, the first pixel of Block 0 has no adjacent block (preceding block), and hence is arranged to be continuous with Block 0. Moreover, the reference symbol (e.g., P1) interposed between the block number (e.g., Block 1) and the pixel number (e.g., S1) is a number shown to indicate a position of the pixel for description.

One block consists of four pixels, and each block in Line 1 of FIG. 9A after replacement has the following configuration based on the block number (e.g., Block 0). Specifically, Block 0 includes S1, S2, S3, and S5 in the stated order. Similarly, Block 1 includes S4, S6, S7, and S9 in the stated order, and Block 2 includes S8, S10, S11, and S13 in the stated order.

Next, a method of replacing addresses (pixel positions) from which to read the magnification profile by referring to the above-mentioned offset table and replacement pattern table will be described with reference to FIG. 9B. FIG. 9B is a diagram obtained by depicting arrows indicating positional relationships of replacement of pixels in FIG. 9A. Block 0 in Line 1 consists of P0 to P5 of FIG. 9B. Pixel numbers 0 to 3 of the signal AL corresponding to the replacement pattern are set to P1 to P4, respectively. Of those pixels, the pixel set to P4 is the first pixel in Block 1. Meanwhile, in processing of Block 2, the pixel set to P5 is the last pixel (fourth pixel) in Block 0.

(Processing of Line 2)

Next, control of replacement processing in each line will be described. As to Line 1, replacement is not performed, and hence a description thereof is omitted. As to Line 2, with the random number of 23, the replacement pattern (3, 2, 1, 0) is selected from the replacement pattern table of FIG. 6A. In this case, the signal IAL of 3 is output when the signal AL is 0, the signal IAL of 2 is output when the signal AL is 1, the signal IAL of 1 is output when the signal AL is 2, and the signal IAL of 0 is output when the signal AL is 3.

Processing in the case of Block 0 will be described. First, for the pixel set to the position P1 (the signal AL in this case is 0), based on the table of FIG. 8B, offset addresses (−5, −3, −2, 0) for the case where In=0 are output from the offset table output portion 711 to the replacement pattern converter 710. The offset addresses (−5, −3, −2, 0) indicate offsets when the value of the signal AL is 0, 1, 2, and 3, respectively. As to P1, the replacement pattern has a value of 3 when the signal AL is 0, and the offset address has an offset of 0 when the signal AL is 3, with the result that S1 at the position P1, which is obtained by adding 0 to the position P1, is set at the position P1. Then, as to P2 (in this case, the signal AL is 1), the replacement pattern has a value of 2 when the signal AL is 1, and based on the table of FIG. 8B, the offset addresses (−2, 0, 1, 3) in the case where In=1 (signal AL=1) have an offset of 1 when the signal AL is 2. As a result, S3 at the position P3, which is obtained by adding 1 to the position P2, is set at the position P2. Next, as to P3 (in this case, the signal AL is 2), the replacement pattern has a value of 1 when the signal AL is 2, and based on the table of FIG. 8B, the offset addresses (−3, −1, 0, 2) in the case where In=2 (signal AL=2) have an offset of −1 when the signal AL is 1. As a result, S2 at the position P2, which is obtained by adding −1 to the position P3, is set at the position P3. Moreover, as to P4 (in this case, the signal AL is 3), the replacement pattern has a value of 0 when the signal AL is 3, and based on the table of FIG. 8B, the offset addresses (0, 2, 3, 5) in the case where In=3 (signal AL=3) have an offset of 0 when the signal AL is 0. As a result, S4 at the position P4, which is obtained by adding 0 to the position P4, is set at the position P4.

Block 1 is processed similarly as for Block 0, with the result that S5, S7, S6, and S8 are set to the positions P5 to P8, respectively. Further, for Block 2, S9, S11, S10, and S12 are set to the positions P9 to P12, respectively.

(Processing of Line 3)

As to Line 3, with the random number of 2, the replacement pattern (0, 2, 1, 3) is selected from the replacement pattern table of FIG. 6A. In this case, the signal IAL of 0 is output when the signal AL is 0, the signal IAL of 2 is output when the signal AL is 1, the signal IAL of 1 is output when the signal AL is 2, and the signal IAL of 3 is output when the signal AL is 3.

Processing in the case of Block 1 will be described. First, for the pixel set to the position P5 (the signal AL in this case is 0), based on the table of FIG. 8B, offset addresses (−5, −3, −2, 0) for the case where In=0 are output from the offset table output portion 711 to the replacement pattern converter 710. The offset addresses (−5, −3, −2, 0) indicate offsets when the value of the signal AL is 0, 1, 2, and 3, respectively. As to P5, the replacement pattern has a value of 0 when the signal AL of the replacement table is 0, and the offset address has an offset of −5 when the signal AL is 0, with the result that S1 at the position P0, which is obtained by adding −5 to the position P5, is set at the position P5. There is no block in front of Block 0, and thus S1 is set at the position P0.

Then, as to P6 (in this case, the signal AL is 1), the replacement table has a value of 2 when the signal AL is 1, and based on the table of FIG. 8B, the offset addresses (−2, 0, 1, 3) in the case where In=1 (signal AL=1) have an offset of 1 when the signal AL is 2. As a result, S7 at the position P7, which is obtained by adding 1 to the position P6, is set at the position P6. Next, as to P7 (in this case, the signal AL is 2), the replacement table has a value of 1 when the signal AL is 2, and based on the table of FIG. 8B, the offset addresses (−3, −1, 0, 2) in the case where In=2 (signal AL=2) have an offset of −1 when the signal AL is 1. As a result, S6 at the position P6, which is obtained by adding −1 to the position P7, is set at the position P7. Moreover, as to P8 (in this case, the signal AL is 3), the replacement table has a value of 3 when the signal AL is 3, and based on the table of FIG. 8B, the offset addresses (0, 2, 3, 5) in the case where In=3 (signal AL=3) have an offset of 5 when the signal AL is 3. As a result, S13 at the position P13, which is obtained by adding 5 to the position P8, is set at the position P8.

(Processing of Line 4)

As to Line 4, with the random number of 7, the replacement pattern (1, 0, 3, 2) is selected from the replacement pattern table of FIG. 6A. In this case, the signal IAL of 1 is output when the signal AL is 0, the signal IAL of 0 is output when the signal AL is 1, the signal IAL of 3 is output when the signal AL is 2, and the signal IAL of 2 is output when the signal AL is 3.

Processing in the case of Block 1 will be described. First, for the pixel set to the position P5 (the signal AL in this case is 0), based on the table of FIG. 8B, offset addresses (−5, −3, −2, 0) for the case where In=0 is output from the offset table output portion 711 to the replacement pattern converter 710. The offset addresses (−5, −3, −2, 0) indicate offsets when the value of the signal AL is 0, 1, 2, and 3, respectively. As to P5, the replacement table has a value of 1 when the signal AL is 0, and the offset address has an offset of −3 when the signal AL is 1, with the result that S2 at the position P2, which is obtained by adding −3 to the position P5, is set at the position P5. Then, as to P6 (in this case, the signal AL is 1), the replacement table has a value of 0 when the signal AL is 1, and based on the table of FIG. 8B, the offset addresses (−2, 0, 1, 3) in the case where In=1 (signal AL=1) have an offset of −2 when the signal AL is 0. As a result, S4 at the position P4, which is obtained by adding −2 to the position P6, is set at the position P6. Next, as to P7 (in this case, the signal AL is 2), the replacement table has a value of 3 when the signal AL is 2, and based on the table of FIG. 8B, the offset addresses (−3, −1, 0, 2) in the case where In=2 (signal AL=2) have an offset of 2 when the signal AL is 3. As a result, S9 at the position P9, which is obtained by adding 2 to the position P7, is set at the position P7. Moreover, as to P8 (in this case, the signal AL is 3), the replacement table has a value of 2 when the signal AL is 3, and based on the table of FIG. 8B, the offset addresses (0, 2, 3, 5) in the case where In=3 (signal AL=3) have an offset of 3 when the signal AL is 2. As a result, S11 at the position P11, which is obtained by adding 3 to the position P8, is set at the position P8.

As described above, one block consists of four pixels, and a wider region may be included in a small block size, with the result that moire components may be effectively dispersed to a wide range. Therefore, the effect of reducing moire may be increased, and the image quality may be improved.

As described above, according to the embodiment, the magnification correction of the image size may be performed while suppressing the generation of moire.

[Third Embodiment]

In the first embodiment, the number of combinations of replacement patterns of pixels (pixel sizes) is 24 for four pixels forming one block as illustrated in FIG. 6A. This value is a value of a permutation 4!(=24). In general, the combinations of replacement of pixels are determined by a factorial of the number of pixels forming one block. Therefore, when the number of pixels forming one block is increased, the number of combinations of replacement of pixels is increased abruptly, with the result that the scale of hardware is increased to affect the cost. In a third embodiment of the present invention, there will be described an example of reducing the number of combinations of pixel replacement patterns when the number of pixels forming one block is increased.

FIG. 10A is a table for showing an example of replacement patterns corresponding to random numbers when the number of pixels of one block is 8. In FIG. 10A, the random number is a random number generated by the random number generator 708 of FIG. 2 described above, and in the embodiment, the number of random numbers is eight, that is, 0 to 7, which is the same as the number of pixels forming one block. The replacement pattern shows a replacement pattern output from the replacement pattern converter 710 of FIG. 2 for an input AL corresponding to each random number, that is, a replacement pattern indicating replaced signals IAL(0 to 7) for the input signals AL(0 to 7). For example, when the random number is 0, for the input signals AL(0, 1, 2, 3, 4, 5, 6, 7), signals IAL(0, 1, 2, 3, 4, 5, 6, 7), which form a replacement pattern in which the pixel positions are not replaced, are selected. Moreover, when the random number is 1, for the input signals AL(0, 1, 2, 3, 4, 5, 6, 7), signals IAL(7, 0, 1, 2, 3, 4, 5, 6), which form a replacement pattern in which the pixel positions are shifted by one, are selected. Further, when the random number is 2, signals IAL(6, 7, 0, 1, 2, 3, 4, 5), which form a replacement pattern in which the pixel positions are further shifted by one from the replacement pattern when the random number is 1, are selected.

As described above, in the embodiment, the replacement patterns are combinations in which the pixel positions are circulated in one block. Thus, the number of replacement patterns is reduced, and an increase in scale of hardware may be suppressed.

As described above, according to the embodiment, the magnification correction of the image size may be performed while suppressing the generation of moire.

[Fourth Embodiment]

When the number of pixels forming one block is increased, pixels having significantly different pixel sizes may be included in one block. When replacement is performed between the pixels having the significantly different pixel sizes, pixel deviation is increased. To address the problem, in a fourth embodiment of the present invention, there will be described an example in which a replacement pattern table is generated excluding combinations with which the pixel deviation is increased.

Figures 11A, 11B, 11C:
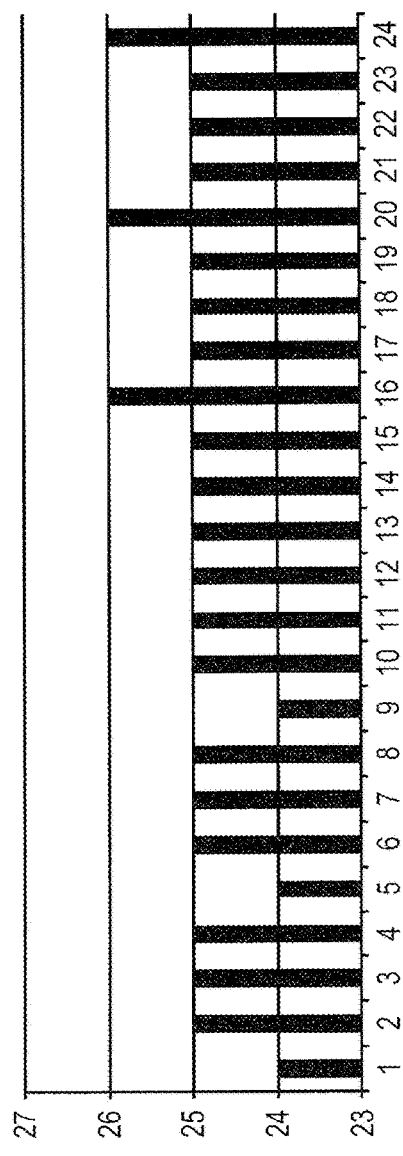
FIG. 11A and FIG. 11B are diagrams for illustrating a relationship between pixel sizes of respective pixels and blocks in the fifth embodiment.
FIG. 11C is a diagram for illustrating a table selection signal.
Figure 13A:
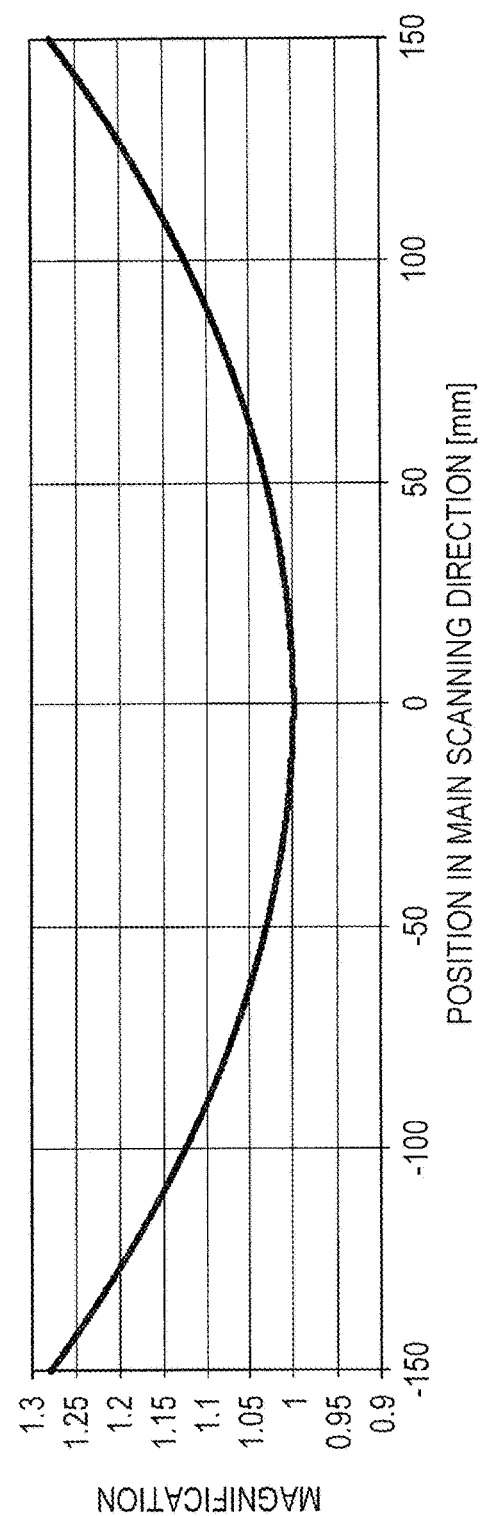
FIG. 13A is a graph for showing a characteristic of a light scanning apparatus without an fθ lens.

In FIG. 11A, there is illustrated an example in which, for image data in which one block consists of eight pixels, the pixel size is changed in accordance with the pixel size set in the magnification profile. In FIG. 11A, pixel sizes of three blocks, that is, Block 0, Block 1, and Block 2, each of which consists of eight pixels, are illustrated. Numbers 24, 25, and 26 shown in the squares in FIG. 11A indicate pixel sizes. Block 0 includes two types of pixels having pixel sizes of 24 and 25. Block 1 includes three types of pixels having pixel sizes of 24, 25, and 26. Block 2 includes two types of pixels having pixel sizes of 25 and 26. FIG. 11B is a diagram for expressing FIG. 11A in a form of a graph. In FIG. 11B, the vertical axis indicates the pixel size (24 to 27), and the horizontal axis is a pixel number, and pixels in Block 0 to Block 2 are denoted by serial numbers (1 to 24). In FIG. 11B, pixel sizes of pixels 1 and 8 at the ends of Block 0 are 24 and 25, and a difference between the pixel sizes is 1. Similarly, pixel sizes of pixels 17 and 24 at the ends of Block 2 are 25 and 26, and a difference between the pixel sizes is 1. In contrast, pixel sizes of pixels 9 and 16 at the ends of Block 1 are 24 and 26, and a difference between the pixel sizes is 2. Therefore, when the pixels at the ends are replaced with each other, as compared to Blocks 0 and 2, the pixel deviation is large in the case of Block 1.

To address the above-mentioned problem, in FIG. 6B and FIG. 10B, there are illustrated replacement patterns excluding the replacement between pixels at the ends in one block, which generates a large difference between the pixel sizes, and hence causes large pixel deviation when the replacement is performed to affect a large number of pixels. In FIG. 6B, of the replacement patterns described above in the first embodiment, replacement patterns excluding patterns in which the replacement patterns replace the signal AL(0) and the signal AL(3) by the signal AL(3) and the signal AL(0), respectively, are shown. In FIG. 6B, the excluded patterns are replacement patterns with a hyphen (–) in the random number column. As a result, in the case of FIG. 6B, the number of generated random numbers is 14 including 0 to 13, and the number of replacement patterns is reduced by 10 as compared to FIG. 6A.

Further, in FIG. 10B, an example of replacement patterns in the case of FIG. 10A described above in the third embodiment, in which one block consists of eight pixels, is shown. In this case, of the replacement patterns of FIG. 10A, replacement patterns excluding patterns in which the replacement patterns replace the signal AL(0) and the signal AL(7) with the signal AL(7) and the signal AL(0), respectively, are shown. In FIG. 10B, the excluded patterns are the replacement patterns with a hyphen (–) in the random number column. As a result, in the case of FIG. 10B, the number of generated random numbers is 6 including 0 to 5 as compared to 8 in FIG. 10A.

With the above-mentioned configuration, occurrence of the pixel deviation may be suppressed, and the number of replacement patterns may be reduced to suppress an enlargement of the scale of hardware.

As described above, according to the embodiment, the magnification correction of the image size may be performed while suppressing the generation of moire.

[Fifth Embodiment]

In the fourth embodiment, as to the table of replacement patterns, the table excluding the combinations of replacement that are prone to cause the pixel deviation is used. For example, in FIG. 11B described above in the fourth embodiment, the only case where the pixel deviation is prone to occur with the replacement between the pixels at the ends in one block is that of Block 1. Therefore, in the magnification profile of FIG. 11B, the pixel deviation is prone to occur in Block 1. Therefore, in selecting a replacement pattern, control of switching a table with prohibition (FIG. 10A) and a tale without prohibition (FIG. 10B) depending on the block may be performed. In FIG. 11C, a table selection signal for selecting a table indicating a replacement pattern is illustrated. The table selection signal is a signal for determining whether or not there is a combination of pixels with a difference between pixel sizes being a predetermined value of 2 or more in the magnification profile. In the case of a block including the combination of pixels with the difference between the pixel sizes being 2 or more, the table selection signal takes a high (H) level. In the case of a block including a combination of pixels with a difference between the pixel sizes being less than 2, the table selection signal takes a low (L) level. With this configuration, the table of replacement patterns corresponding to the magnification profile may be selected to prevent the pixel deviation accompanying the pixel replacement.

As described above, according to the embodiment, the magnification correction of the image size may be performed while suppressing the generation of moire.

[Sixth Embodiment]

In the above-mentioned embodiments, the replacement of pixels is performed in accordance with the replacement pattern selected through generation of a random number for each scanning line. In a sixth embodiment of the present invention, there will be described an example in which replacement of pixels is performed in accordance with a replacement pattern selected through generation of a random number for each block (for each pixel group). The configuration in the embodiment is similar to that in the first embodiment described above, and differences from FIG. 2 of the first embodiment will be described below.

In the random number generator 708 illustrated in FIG. 2, a random number is generated every time the main scan synchronizing signal, which is the BD signal, is input, that is, for each scanning line. In contrast, in the embodiment, the random number generator 708 monitors the lower bits AL of the signal A from the main scan counter 705 to generate a random number every time switching of one block is detected. For example, in the case of the configuration in which one block consists of four pixels, when the lower two bits of the signal A are 0s, a random number is generated. Similarly, in the case of the configuration in which one block consists of eight pixels, when the lower three bits of the signal A are 0s, a random number is generated.

FIG. 12A is a diagram for illustrating processing in the embodiment. In FIG. 12A, there are illustrated random numbers for Block 0 and Block 1 in Line 1 and Line 2, the replacement patterns, which correspond to the random numbers and are read from FIG. 6A, and pixel sizes after replacement. In Line 1 of FIG. 12A, for Block 0, a random number of 0 is generated, and a corresponding replacement pattern (0, 1, 2, 3) and pixel sizes (S1, S2, S3, S4) corresponding to the replacement pattern are illustrated. For Block 1, a random number of 2 is generated, and a corresponding replacement pattern (0, 2, 1, 3) and pixel sizes (S5, S7, S6, S8) corresponding to the replacement pattern are illustrated.

Similarly, in Line 2, for Block 0, a random number of 23 is generated, and a corresponding replacement pattern (3, 2, 1, 0) and pixel sizes (S4, S3, S2, S1) corresponding to the replacement pattern are illustrated. For Block 1, a random number of 13 is generated, and a corresponding replacement pattern (2, 0, 3, 1) and pixel sizes (S7, S5, S8, S6) corresponding to the replacement pattern are illustrated. Moreover, FIG. 12B is a diagram obtained by depicting arrows indicating positional relationships of replacement in FIG. 12A. In this manner, the order of replacement of the pixel sizes is different for each block and each line. As a result, even for a period that is prone to cause interference between the block size and image data, a degradation in image quality due to moire and other such factors may be prevented.

In the first embodiment described above, the number of pixels included in one block, that is, the block size is set to a power of 2, and the lower two bits of the signal A from the main scan counter are manipulated to perform the replacement processing of the pixels. For example, even with a block size other than a power of 2, a value output by the main scan counter may be separated to a quotient and a remainder with the block size being a divisor, and the remainder portion may be replaced as in the first embodiment to perform the replacement processing of pixels in a block. Moreover, in the above-mentioned embodiments, the light scanning apparatus without the fθ lens has been described. The embodiment is equally applicable to a case where an fθ lens has low accuracy and requires correction of an image ratio, for example.

As described above, according to the embodiment, the magnification correction of the image size may be performed while suppressing the generation of moire.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-064115, filed Mar. 28, 2016, which is hereby incorporated by reference herein in its entirety.

What is claimed is:

1. An image forming apparatus, comprising:
a light source;
a photosensitive member, which is rotated in a first direction so that a latent image is formed on the photosensitive member with a light beam emitted from the light source in accordance with image data;
a deflecting unit configured to deflect the light beam emitted from the light source to move a light spot of the light beam radiated to the photosensitive member in a second direction orthogonal to the first direction;
a conversion unit configured to convert the image data into a plurality of bit data corresponding to a density on a pixel-by-pixel basis;
a specifying unit configured to specify a pixel size that is a number of divided pixels forming a pixel formed on the photosensitive member with the light beam, in accordance with a position of the pixel in the second direction; and
a correction unit configured to correct the plurality of bit data in accordance with the pixel size specified by the specifying unit,
wherein the specifying unit specifies pixel sizes of pixels after an arrangement of the pixels in the second direction in a pixel group is replaced for each pixel group, the pixel group being obtained by dividing, with respect to a predetermined number of pixels, pixels arranged in the second direction.

2. An image forming apparatus according to claim 1, wherein a sum of the pixel sizes of the pixels in the pixel group remains unchanged before and after the arrangement of the pixels is replaced.

3. An image forming apparatus according to claim 2, further comprising a generation unit configured to generate a random number based on the number of pixels in the predetermined number of pixels,
wherein the specifying unit replaces the arrangement of the pixels based on a combination selected in accordance with the random number from among all combinations of the arrangement of the pixels corresponding to the predetermined number of pixels.

4. An image forming apparatus according to claim 3, wherein the combination in accordance with the random number is selected for each pixel group.

5. An image forming apparatus according to claim 3, wherein the combination in accordance with the random number is applied to all of the pixel groups.

6. An image forming apparatus according to claim 3, wherein replacement of arrangement between a first pixel and a last pixel in order of the second direction in the pixel group is excluded from the combinations for replacing the arrangement of the pixels.

7. An image forming apparatus according to claim 3, wherein, in a case where a difference between pixel sizes of a first pixel and a last pixel in order of the second direction in the pixel group is larger than a predetermined value, replacement of the arrangement of the pixels is selected from among combinations excluding a combination of replacing arrangement of the first pixel and the last pixel.

8. An image forming apparatus according to claim 3, wherein the correction unit comprises:
an elongation portion configured to elongate the plurality of bit data by inserting a reproduced bit data into the plurality of bit data; and
a specifying portion configured to specify a bit position at which the reproduced bit data is to be inserted in accordance with the pixel size specified by the specifying unit,
wherein the specifying portion includes a storage portion in which bit position information for inserting the reproduced bit data in accordance with the pixel size is stored,
wherein the specifying portion reads, based on the pixel size specified by the specifying unit in accordance with the position of the pixel in the second direction, the bit position information from the storage portion, and
wherein the elongation portion reproduces a bit data at a bit position specified based on the bit position information read by the specifying portion, and inserts a reproduced bit data into a bit position adjacent to the specified bit position.

9. An image forming apparatus according to claim 2, further comprising a generation unit configured to generate a random number based on the number of pixels in the predetermined number of pixels,
wherein the specifying unit replaces the arrangement of the pixels based on a combination selected in accordance with the random number from among some combinations of all combinations of the arrangement of the pixels corresponding to the predetermined number of pixels.

10. An image forming apparatus according to claim 1, wherein the predetermined number of pixels is a power of 2.

11. An image forming apparatus, comprising:
a light source;
a photosensitive member, which is rotated in a first direction so that a latent image is formed on the photosensitive member with a light beam emitted from the light source in accordance with image data;
a deflecting unit configured to deflect the light beam emitted from the light source to move a light spot of the light beam radiated to the photosensitive member in a second direction orthogonal to the first direction;
a conversion unit configured to convert the image data into a plurality of bit data corresponding to a density on a pixel-by-pixel basis;
a specifying unit configured to specify a pixel size that is a number of divided pixels forming a pixel formed on the photosensitive member with the light beam, in accordance with a position of the pixel in the second direction; and
a correction unit configured to correct the plurality of bit data in accordance with the pixel size specified by the specifying unit,
wherein the specifying unit specifies pixel sizes of pixels after an arrangement of the pixels in the second direction in adjacent pixel groups is replaced, each pixel group being obtained by dividing, with respect to a predetermined number of pixels, pixels arranged in the second direction.

12. An image forming apparatus according to claim 11, further comprising a generation unit configured to generate a random number based on the number of pixels in the predetermined number of pixels,
wherein the specifying unit replaces the arrangement of the pixels based on a combination selected in accordance with the random number from among all combinations of the arrangement of the pixels corresponding to the predetermined number of pixels, and on an offset corresponding to a pixel position of each of the pixels.

13. An image forming apparatus according to claim 12, wherein the specifying unit replaces a first pixel in order of the second direction in the pixel group with a pixel selected from pixels in a preceding adjacent pixel group, and replaces a last pixel in order of the second direction in the pixel group with a pixel selected from pixels in a succeeding adjacent pixel group.

14. An image forming apparatus according to claim 11, further comprising a generation unit configured to generate a random number based on the number of pixels in the predetermined number of pixels,
wherein the specifying unit replaces the arrangement of the pixels based on a combination selected in accordance with the random number from among some combinations of all combinations of the arrangement of the pixels corresponding to the predetermined number of pixels, and on an offset corresponding to a pixel position of each of the pixels.

15. A correction method for an image forming apparatus, the image forming apparatus including:
a light source;
a photosensitive member, which is rotated in a first direction so that a latent image is formed on the photosensitive member with a light beam emitted from the light source in accordance with image data; and
a deflecting unit configured to deflect the light beam emitted from the light source to move a light spot of the light beam radiated to the photosensitive member in a second direction orthogonal to the first direction,
the correction method comprising:
converting the image data into a plurality of bit data corresponding to a density on a pixel-by-pixel basis;
specifying a pixel size that is a number of divided pixels forming a pixel formed on the photosensitive member with the light beam, in accordance with a position of the pixel in the second direction; and
correcting the plurality of bit data in accordance with the pixel size specified in the specifying of the pixel size,
wherein the specifying of the pixel size comprises specifying pixel sizes of pixels after an arrangement of the pixels in the second direction in a pixel group is replaced for each pixel group, the pixel group being obtained by dividing, with respect to a predetermined number of pixels, pixels arranged in the second direction.

16. A correction method for an image forming apparatus, the image forming apparatus including:
a light source;
a photosensitive member, which is rotated in a first direction so that a latent image is formed on the photosensitive member with a light beam emitted from the light source in accordance with image data; and
a deflecting unit configured to deflect the light beam emitted from the light source to move a light spot of the light beam radiated to the photosensitive member in a second direction orthogonal to the first direction,
the correction method comprising:
converting the image data into a plurality of bit data corresponding to a density on a pixel-by-pixel basis;
specifying a pixel size that is a number of divided pixels forming a pixel formed on the photosensitive member with the light beam, in accordance with a position of the pixel in the second direction; and
correcting the plurality of bit data in accordance with the pixel size specified in the specifying of the pixel size,
wherein the specifying of the pixel size comprises specifying pixel sizes of pixels after an arrangement of the pixels in the second direction in adjacent pixel groups is replaced, each pixel group being obtained by dividing, with respect to a predetermined number of pixels, pixels arranged in the second direction.

* * * * *